United States Patent [19]
Kalotay et al.

[11] Patent Number: 5,009,109
[45] Date of Patent: Apr. 23, 1991

[54] FLOW TUBE DRIVE CIRCUIT HAVING A BURSTY OUTPUT FOR USE IN A CORIOLIS METER

[75] Inventors: Paul Kalotay, Lafayette; Robert Bruck, Boulder; Arnold Emch, Estes Park; Donald Martella, Louisville, all of Colo.

[73] Assignee: Micro Motion, Inc., Boulder, Colo.

[21] Appl. No.: 446,614

[22] Filed: Dec. 6, 1989

[51] Int. Cl.$^5$ .............................................. G01F 1/84
[52] U.S. Cl. .................................. 73/861.38; 331/154
[58] Field of Search ............. 73/861.37, 861.38, 32 A; 331/154, 155, 65

[56] References Cited

U.S. PATENT DOCUMENTS 4,912,962  4/1990  Kawaguchi .................. 73/32 A

*Primary Examiner*—Herbert Goldstein
*Attorney, Agent, or Firm*—Peter L. Michaelson

[57] ABSTRACT

A drive circuit for providing bursts, rather than continuously alternating amounts, of energy for use in driving a flow tube (conduit) in a Coriolis meter and methods for use in such a circuit. Specifically, the drive circuit provides a pre-defined burst of energy to a drive coil affixed to a flow conduit at an appropriate point during a cycle of the oscillatory motion of the conduit in order to maintain the peak amplitude of the oscillatory motion substantially within a prescribed range. This burst can be applied at a pre-defined point, illustratively the peak, in each cycle of the oscillatory motion with no energy being applied during that cycle other than when the pulse occurs in order to reduce the amount of electrical energy applied to the drive coil. Alternatively, to further reduce this energy, a burst need not be applied during every such cycle but rather only at those pre-defined points, e.g. the peaks, within those cycles where the velocity of the flow conduit is less than a pre-defined limit value.

15 Claims, 6 Drawing Sheets

FLOW TUBE DRIVE CIRCUIT HAVING A BURSTY OUTPUT FOR USE IN A CORIOLIS METER

BACKGROUND OF THE INVENTION

1. Field of the Invention

The invention relates to apparatus for a drive circuit that provides bursts, rather than continuously alternating amounts, of energy for use in driving a flow tube (conduit) in a Coriolis meter and to methods for use in such a circuit.

2. Description of the Prior Art

Currently, Coriolis meters are finding increasing use as an accurate way to measure the mass flow rate and/or density of various process fluids in many applications.

Generally speaking, a Coriolis mass flow rate meter, such as that described in U.S. Pat. No. 4,491,025 (issued to J. E. Smith et al on Jan. 1, 1985), contains one or two parallel conduits, each typically being a U-shaped flow conduit or tube. Each flow conduit is driven to oscillate about an axis to create a rotational frame of reference. For a U-shaped flow conduit, this axis can be termed the bending axis. As process fluid flows through each oscillating flow conduit, movement of the fluid produces reactionary Coriolis forces that are orthogonal to both the velocity of the fluid and the angular velocity of the conduit. These reactionary Coriolis forces, though quite small when compared to the force at which the conduits are driven, nevertheless cause each conduit to twist about a torsional axis that, for a U-shaped flow conduit, is normal to its bending axis. The amount of twist imparted to each conduit is related to the mass flow rate of the process fluid flowing therethrough. This twist is frequently measured using velocity signals obtained from magnetic velocity sensors that are mounted to one or both of the flow conduits in order to provide a complete velocity profile of the movement of each flow conduit with respect to either the other conduit or a fixed reference. In dual tube meters, both flow conduits are oppositely driven such that each conduit oscillates (vibrates) as a separate tine of a tuning fork. This "tuning fork" operation advantageously cancels substantially all undesirable vibrations that might otherwise mask the Coriolis force.

In such a Coriolis meter, the mass flow rate of a fluid that moves through the meter is proportional to the time interval that elapses between the instant one point situated on a side leg of a flow conduit crosses a predetermined location, e.g. a respective mid-plane of oscillation, until the instant a corresponding point situated on the opposite side leg of the same flow conduit, crosses its corresponding location, e.g. its respective mid-plane of oscillation. For parallel dual conduit Coriolis mass flow rate meters, this interval is equal to the phase difference between the velocity signals generated for both flow conduits at the fundamental (resonant) frequency at which these flow conduits are driven. In addition, the resonant frequency at which each flow conduit oscillates depends upon the total mass of that conduit, i.e. the mass of the conduit itself, when empty, plus the mass of any fluid flowing therethrough. Inasmuch as the total mass varies as the density of the fluid flowing through the tube varies, the resonant frequency likewise varies with any changes in fluid density and as such can be used to track changes in fluid density.

As noted above, these mass flow and density relationships inherent in a Coriolis meter require that each flow conduit in the meter must be driven to resonantly vibrate in order for the meter to properly operate. To ensure that proper vibratory motion is initiated in, for example a dual tube Coriolis meter, and thereafter maintained during operation of the meter, the meter contains an appropriate drive mechanism that is mounted to both of the flow conduits typically between corresponding extremities of these conduits. The drive mechanism frequently contains any one of many well known arrangements, such as a magnet mounted to one conduit and a coil mounted to the other conduit in an opposing relationship to the magnet. A drive circuit continuously applies a periodic, typically sinusoidally or square shaped, drive voltage to the drive mechanism. Through interaction of the continuous alternating magnetic field produced by the coil in response to the periodic drive signal and the constant magnetic field produced by the magnet, both flow conduits are initially forced to vibrate in an opposing sinusoidal pattern which is thereafter maintained. Inasmuch as the drive circuit tightly synchronizes the frequency of the drive signal to essentially match the resonant frequency of the conduits, both flow conduits are kept in a state of opposing substantially resonant sinusoidal motion.

One known drive circuit currently in use today and typified by that disclosed in, for example, U.S. Pat. No. 4,777,833 (issued to B. L. Carpenter on Oct. 18, 1988—hereinafter referred to as the '833 Carpenter patent—and currently owned by the present assignee) utilizes an analog drive circuit. Specifically, this circuit utilizes a synchronous analog amplifier to generate a continuous square wave with two analog levels that each equally change based upon a simultaneously occurring difference between an analog reference voltage and a flow conduit position signal. As the magnitude of this difference increases (decreases), based upon decreasing (increasing) amplitudes of the oscillatory movement of the flow conduits which results from, for example, increases (decreases) in the density in the process fluid that simultaneously flows through the flow conduits, positive and negative drive levels produced by the synchronous amplifier corresponding and equally increase (decrease) to once again restore the amplitude of the oscillatory flow tube movement to its proper level. Various analog components, such as inter alia amplifiers, buffers, a phase shifter and an edge detector, are used to appropriately determine this difference based upon the analog reference level and one of the velocity sensor signals, typically a left velocity sensor signal, produced within the meter.

Unfortunately, analog drive circuits used in Coriolis meters and typified by that described in the '833 Carpenter patent suffer from various drawbacks.

First, analog drive circuits, particularly those which provide an alternating square shaped drive signal to the coil, do not permit the energy that is applied to the drive coil to be precisely controlled by the drive circuit itself at any one instant during the signal. With these circuits, the drive signal is merely set to alternate between two levels that are static within any one drive cycle. Precise control over the energy supplied to drive coil by the drive circuit itself has proven to be particularly important in those applications, such as intended use of the meter particularly the mechanical Coriolis metering assembly itself in a hazardous environment, where a critical need exists to always limit this energy to as low a value as is realistically possible. While intrinsic safety barriers are used in these applications to limit the energy that would flow to the drive coil located in a hazardous area to below a pre-defined maximum amount and in doing so perform extremely well, it would be preferable to further limit the energy at its source, if possible, i.e. drive circuit, and rely on the barrier as a back-up protective device rather than as a main mechanism for limiting the energy.

Second, analog drive circuits generally tend to be complex and require a multitude of parts which adds to the manufacturing cost of the meter electronics.

Third, discrete analog components, such as those used in a drive circuit, may exhibit undesirable temperature, aging and/or drift characteristics any one of which might, over time, cause the output produced by such a component to vary. These affects can be minimized to a certain and usually acceptable extent by using components with matched temperature characteristics, appropriate temperature compensation circuits and/or sufficiently frequent re-calibration. However, use of matched components further increases the cost of the meter electronics, while temperature compensation circuits often require additional components which increase the parts count as well as the manufacturing cost of the drive circuit. Re-calibration disadvantageously increases the costs associated with actual use of the meter.

Therefore, a need exists in the art for a simple and inexpensive flow tube drive circuit particularly suited for use in a Coriolis meter that provides substantially accurate control over the amount of energy that is to be applied to the drive coil at any instant, has a reduced parts count and cost over analog drive circuits known in the art, and does not appreciably, suffer, if at all, from temperature, aging and/or drift affects which are commonly associated with analog drive circuits known in the art.

SUMMARY OF THE INVENTION

An object of the present invention is to provide a drive circuit for use in a Coriolis meter that provides substantially accurate control over the amount of energy that is to be applied to the drive coil at any time.

Another object is to provide such a drive circuit that generates a reduced amount of energy to the drive coil, as compared to that generated by drive circuits known in the art, but which is nevertheless sufficient to maintain the amplitude of the vibratory motion of the flow conduits at a desired level.

Another object is to provide such a drive circuit that does not appreciably suffer from temperature, drift and/or aging affects commonly associated with analog drive circuits known in the art.

Another object is to provide such a drive circuit that has a relatively low parts count and is relatively simple and inexpensive to manufacture.

These and other objects are provided in accordance with the teachings of our inventive drive circuit which provides a pre-defined burst of energy to a drive coil affixed to a flow conduit at an appropriate point during a cycle of the oscillatory motion of the conduit in order to maintain the peak amplitude of the oscillatory motion substantially within a prescribed range. This burst can be applied at a pre-defined point in each cycle of the oscillatory motion with no energy being applied during that cycle other than when the burst occurs in order to reduce the amount of electrical energy applied to the drive coil. Alternatively, to further reduce this energy, a burst need not be applied during every such cycle but rather only at those pre-defined points within those cycles where the amplitude of the oscillatory motion of the flow conduit is less than a pre-defined limit value.

In accordance with the teachings of a preferred embodiment of our invention, our inventive drive circuit periodically samples the left velocity sensor signal throughout a single cycle of this signal using a pre-defined sampling period. These samples are transferred on a direct memory access (DMA) basis, using a well-known cycle stealing technique, from an input/output space into a memory array, both situated within random access memory in a microprocessor. Transferring sampled data values in this manner does not adversely and appreciably affect the throughput of the microprocessor. In response to the samples occurring throughout this cycle of the signal, the drive circuit, specifically the microprocessor contained therein, determines the zero crossings and maximum and minimum values of this cycle and thereafter calculates the absolute value of the peak of the cycle using the maximum and minimum values. Using two adjacent zero crossings contained within the cycle, the microprocessor also determines the approximate frequency of the velocity signal and hence the approximate resonant frequency of the flow conduits. Once these operations have occurred, the microprocessor compares the absolute value of the peak against a pre-defined limit value, $V_{ref}$. This comparison determines whether the amplitude of the vibratory motion of the flow conduits has decayed to a sufficiently low value to warrant the addition of a burst of energy to the drive coil and therethrough to the flow conduits in order to appropriately restore this amplitude. Specifically, in the event the absolute value of the peak is less than the limit value, then the microprocessor illustratively gates a timer/counter circuit to generate a burst, such as a pulse, having a pre-defined shape to the drive coil within a specific window during the remainder of the cycle. Alternatively, if the absolute value of the peak is greater than the limit value, then no such pulse is generated by the timer/counter and hence no burst of energy is applied to the drive coil. Depending upon various mechanical characteristics of the flow tubes and the rate at which the density of the process fluid flowing therethrough changes, several, perhaps quite a number, of cycles of oscillatory flow tube movement may elapse until the absolute value of the peak decays to a sufficiently low value to cause the drive circuit to apply a burst of energy to the flow tubes. In addition, the microprocessor, using the approximate value of the frequency of the velocity signal, determines the number of samples that need to be obtained during the next DMA transfer in order to fully characterize the next cycle of oscillatory flow tube movement and stores this number for use during subsequent initiation of that DMA transfer.

Furthermore, a burst of energy can also be imparted to the drive coil at an appropriate point outside the window during a cycle(s) in order to remove a finite amount of vibratory energy from the flow conduits and thereby effectively retard the peak value of these vibrations, when necessary.

In accordance with a feature of our invention, the drive circuit can adapt its performance to changing operating conditions of the Coriolis meter, such as changes in the density of the process fluid flowing through the meter, while imparting relatively minimal amounts of energy to the drive coil that are nevertheless sufficient to sustain the flow tubes in resonant oscillatory motion with a pre-defined peak value. Specifically, the limit value can be changed, e.g. increased, whenever the rate of change in the absolute value of the peak is sufficiently high so that bursts of mechanical energy can be rapidly added to the vibrating flow conduits, such as over a larger number of successive cycles than would otherwise occur. Adding bursts of energy in this fashion quickly compensates for increased attenuation that occurs in the peak of the vibratory amplitude of the flow tubes, caused by large rapid increases in the fluid density. Moreover, whenever the absolute value of the peak amplitude reaches or exceeds the increased limit value, the limit value can be appropriately decreased to a normal value in order to reduce the rate at which mechanical energy will be imparted to the vibrating flow conduits.

BRIEF DESCRIPTION OF THE DRAWINGS

The teachings of the present invention may be clearly understood by considering the following detailed description in conjunction with the accompanying drawings, in which:

FIG. 3A depicts various waveforms associated with drive circuit 40 shown in FIG. 3;

To facilitate understanding, identical reference numerals have been used, where appropriate, to designate identical elements that are common to the figures.

DETAILED DESCRIPTION

After reading the following description, those skilled in the art will readily appreciate that our inventive drive circuit can be utilized with nearly any Coriolis meter regardless of whether that meter is measuring mass flow rate, density or other parameter(s) of a process fluid. Nevertheless, for purposes of brevity, the inventive drive circuit will be discussed in the context of a meter that specifically measures mass flow rate.

Figure 1:
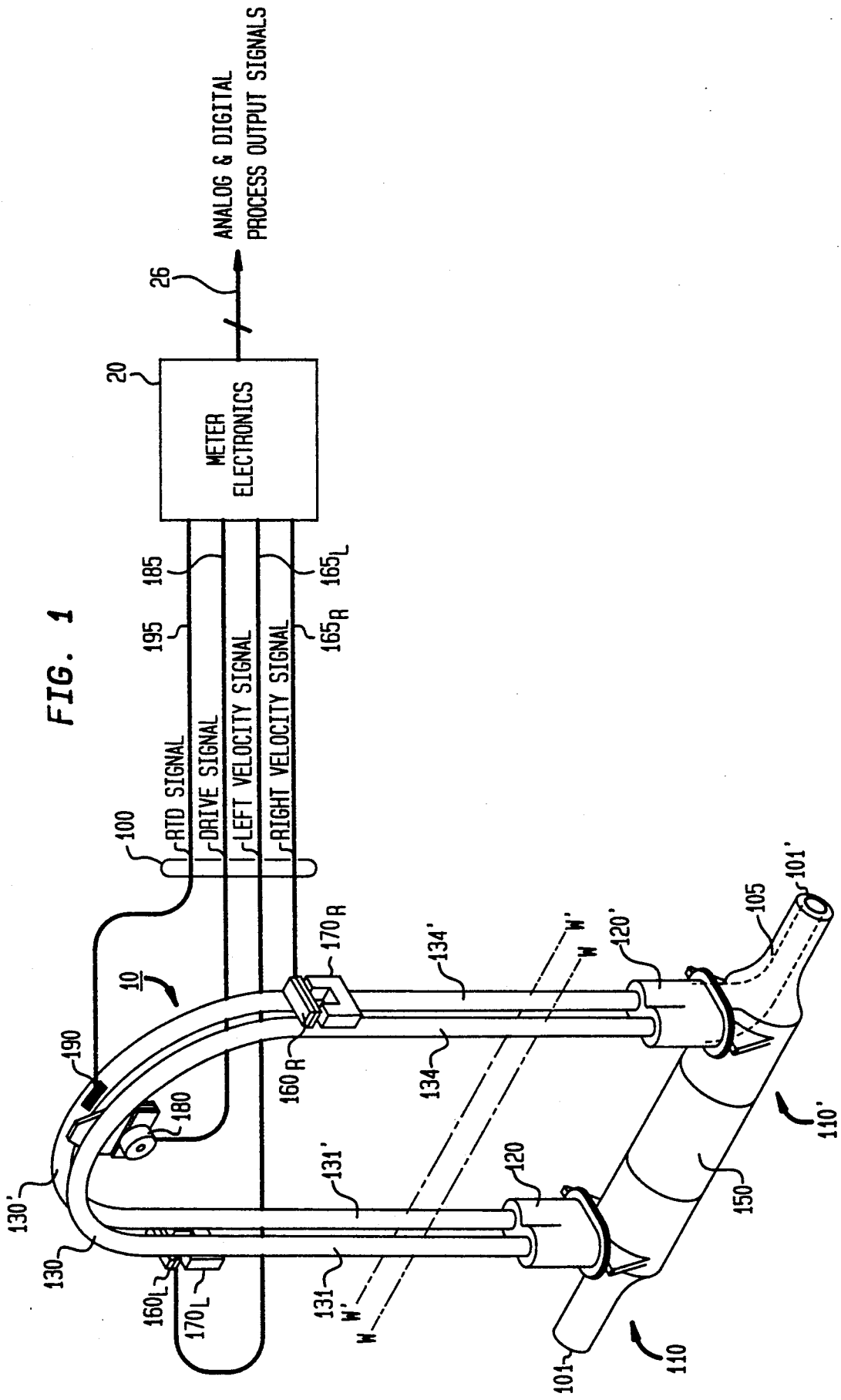
FIG. 1 is an overall diagram of Coriolis mass flow rate metering system 5.

FIG. 1 shows an overall diagram of Coriolis mass flow rate metering system 5.

As shown, system 5 consists of two basic components: Coriolis meter assembly 10 and meter electronics 20. Meter assembly 10 measures the mass flow rate of a desired process fluid. Meter electronics 20, connected to meter assembly 10 via leads 100, illustratively provides mass flow rate and totalized mass flow information. Mass flow rate information is provided over leads 26 in frequency form and in scaled pulse form. In addition, mass flow rate information is also provided in analog 4–20 mA form over leads 26 for easy connection to downstream process control and/or measurement equipment.

Coriolis meter assembly 10, as shown, includes a pair of manifolds 110 and 110'; tubular member 150; a pair of parallel flow conduits (tubes) 130 and 130'; drive mechanism 180; a pair of velocity sensing coils $160_L$ and $160_R$; and a pair of permanent magnets $170_L$ and $170_R$. Conduits 130 and 130' are substantially U-shaped and have their ends attached to conduit mounting blocks 120 and 120', which are, in turn, secured to respective manifolds 110 and 110'. Both flow conduits are free of pressure sensitive joints.

With the side legs of conduits 130 and 130' fixedly attached to conduit mounting blocks 120 and 120' and these blocks, in turn, fixedly attached to manifolds 110 and 110', as shown in FIG. 1, a continuous closed fluid path is provided through Coriolis meter assembly 10. Specifically, when meter 10 is connected, via inlet end 101 and outlet end 101', into a conduit system (not shown) which carries the fluid that is being measured, fluid enters the meter through an orifice in inlet end 101 of manifold 110 and is conducted through a passageway therein having a gradually changing cross-section to conduit mounting block 120. There, the fluid is divided and routed through flow conduits 130 and 130'. Upon exiting flow conduits 130 and 130', the fluid is recombined in a single stream within conduit mounting block 120' and is thereafter routed to manifold 110'. Within manifold 110', the fluid flows through a passageway having a similar gradually changing cross-section to that of manifold 110—as shown by dotted lines 105—to an orifice in outlet end 101'. At end 101' the fluid reenters the conduit system. Tubular member 150 does not conduct any fluid. Instead, this member serves to axially align manifolds 110 and 110' and maintain the spacing therebetween by a pre-determined amount so that these manifolds will readily receive mounting blocks 120 and 120' and flow conduits 130 and 130'.

U-shaped flow conduits 130 and 130' are selected and appropriately mounted to the conduit mounting blocks so as to have substantially the same moments of inertia and spring constants about bending axes W—W and W'—W', respectively. These bending axes are perpendicularly oriented to the side legs of the U-shaped flow conduits and are located near respective conduit mounting blocks 120 and 120'. The U-shaped flow conduits extend outwardly from the mounting blocks in an essentially parallel fashion and have substantially equal moments of inertia and equal spring constants about their respective bending axes. Inasmuch as the spring constant of the conduits changes with temperature, resistive temperature detector (RTD) 190 (typically a platinum RTD device) is mounted to one of the flow conduits, here conduit 130', to continuously measure the temperature of the conduit. The temperature of the conduit and hence the voltage appearing across the RTD, for a given current passing therethrough, will be governed by the temperature of the fluid passing through the flow conduit. The temperature dependent voltage appearing across the RTD is used, in a well known method, by meter electronics 20 to appropriately compensate the value of the spring constant for any changes in conduit temperature. The RTD is connected to meter electronics 20 by lead 195.

Both of these flow conduits are sinusoidally driven in opposite directions about their respective bending axes and at essentially their common resonant frequency. In this manner, both flow conduits will vibrate in the same manner as do the tines of a tuning fork. Drive mechanism 180 supplies the sinusoidal oscillatory driving forces to conduits 130 and 130'. This drive mechanism can consist of any one of many well known arrangements, such as a magnet mounted to illustratively flow conduit 130' and an opposing coil mounted to illustratively flow conduit 130 and through which an alternating current is passed, for sinusoidally vibrating both flow conduits at a common frequency. A suitable continuous alternating drive signal is applied by meter electronics 20, via lead 185, to drive mechanism 180.

With fluid flowing through both conduits while these conduits are sinusoidally driven in opposing directions, Coriolis forces will be generated along adjacent side legs of each of flow conduits 130 and 130' but in opposite directions, i.e. the Coriolis force generated in side leg 131 will oppose that generated in side leg 131'. This phenomenon occurs because although the fluid flows through the flow conduits in essentially the same parallel direction, the angular velocity vectors for the oscillating (vibrating) flow conduits are situated in opposite though essentially parallel directions. Accordingly, during one-half of the oscillation cycle of both flow conduits, side legs 131 and 131' will be twisted closer together than the minimum distance occurring between these legs produced by just the oscillatory movement of the conduits generated by drive mechanism 180. During the next half-cycle, the generated Coriolis forces will twist the side legs 131 and 131' further apart than the maximum distance occurring between these legs produced by just the oscillatory movement of the conduits generated by drive mechanism 180.

During oscillation of the flow conduits, the adjacent side legs, which are forced closer together than their counterpart side legs, will reach the end point of their travel, where their velocity crosses zero, before their counterparts do. The time interval which elapses from the instant one pair of adjacent side legs reaches their end point of travel to the instant the counterpart pair of side legs, i.e. those forced further apart, reach their respective end point is proportional to the total mass flow rate of the fluid flowing through meter assembly 10. The reader is referred to U.S. Pat. No. 4,491,025 (issued to J. E. Smith et. al. on Jan. 1, 1985) for a more detailed discussion of the principles of operation of parallel path Coriolis flow meters than that just presented.

To measure the time interval, $\Delta t$, coils $160_L$ and $160_R$ are attached to either one of conduits 130 and 130' near their free ends and permanent magnets $170_L$ and $170_R$ are also attached near the free ends of the other one of the conduits. Magnets $170_L$ and $170_R$ are disposed so as to have coils $160_L$ and $160_R$ located in the volume of space that surrounds the respective permanent magnets and in which the magnetic flux fields are essentially uniform. With this configuration, the electrical signal outputs generated by coils $160_L$ and $160_R$ provide a velocity profile of the complete travel of the conduit and can be processed, through any one of a number of well known methods, to determine the time interval and, in turn, the mass flow rate of the fluid passing through the meter. In particular, coils $160_L$ and $160_R$ produce the left and right velocity signals that appear on leads $165_L$ and $165_R$, respectively.

As noted, meter electronics 20 accepts as input the RTD signal appearing on lead 195, and left and right velocity signals appearing on leads $165_L$ and $165_R$, respectively. Meter electronics 20 also produces, as noted, the alternating drive signal appearing on lead 185. Leads $165_L$, $165_R$, 185 and 195 are collectively referred to as leads 100. The meter electronics processes both the left and right velocity signal and the RTD temperature, through any one of a number of well known methods, to determine the mass flow rate and totalized mass flow of the fluid passing through meter assembly 10. This mass flow rate is provided by meter electronics 20 on associated lines within leads 26 in analog 4-20 mA form. Mass flow rate information is also provided in frequency form (typically with a maximum range of 0-10 KHz), over an appropriate line within leads 26 for connection to downstream equipment.

Figure 2:
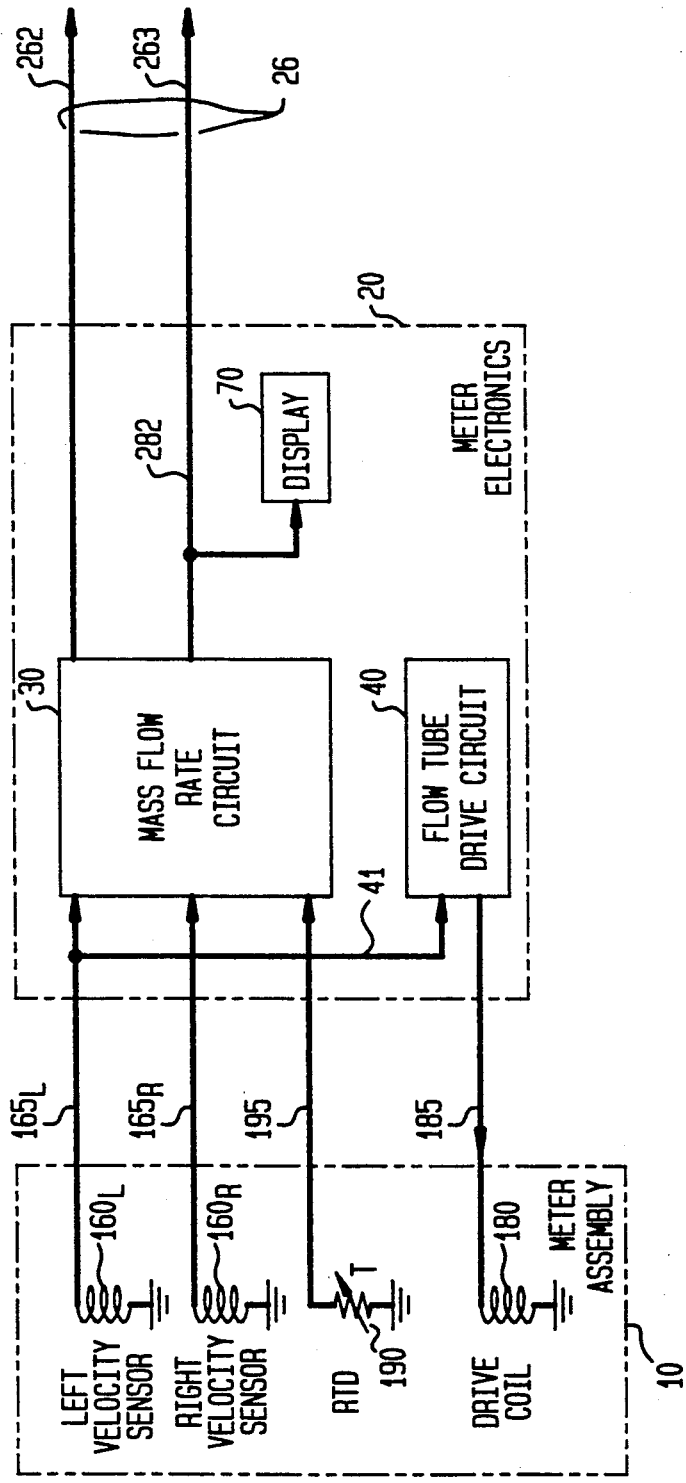
FIG. 2 depicts a block diagram of meter electronics 20 shown in FIG. 1.

A block diagram of meter electronics 20 is depicted in FIG. 2. Here, as shown, meter electronics 20 consists of mass flow rate circuit 30 and flow tube drive circuit 40.

Mass flow rate circuit 30 processes the left and right velocity signals appearing over leads $165_L$ and $165_R$, respectively, along with the RTD signal appearing on lead 195, in a well known manner, to determine the mass flow rate of the fluid passing through meter assembly 10. The resulting mass flow rate information is provided as a 4-20 mA output signal over lead 263, for easy connection to additional downstream process control equipment (not shown), and as a scaled frequency signal over lead 262 for easy connection to a remote totalizer (also not shown). The signals appearing on leads 262 and 263 form part of the process signals that collectively appear on leads 26 shown in FIG. 1. Inasmuch as the method through which circuit 20 generates mass flow rate information is well known to those skilled in the art and does not form any part of the present invention, mass flow rate circuit 30 along with its constituent electronics will not be discussed in any further detail herein. In this regard, the reader is illustratively referred to U.S. Pat. Nos. 4,777,833 (issued to B. L. Carpenter on Oct. 18, 1988) or 4,843,890 (issued to A. L. Samson et al on July 4, 1989) which are both co-owned by the present assignee and which describe different embodiments of circuits that can be used within a Coriolis mass flow rate meter to determine mass flow rate of a process fluid.

Flow tube drive circuit 40, depicted in FIG. 2, provides an alternating drive signal, via lead 185, to drive mechanism 180. This circuit synchronizes the sine wave drive signal to the left velocity signal which appears on leads 165 and 41.

Figure 3:
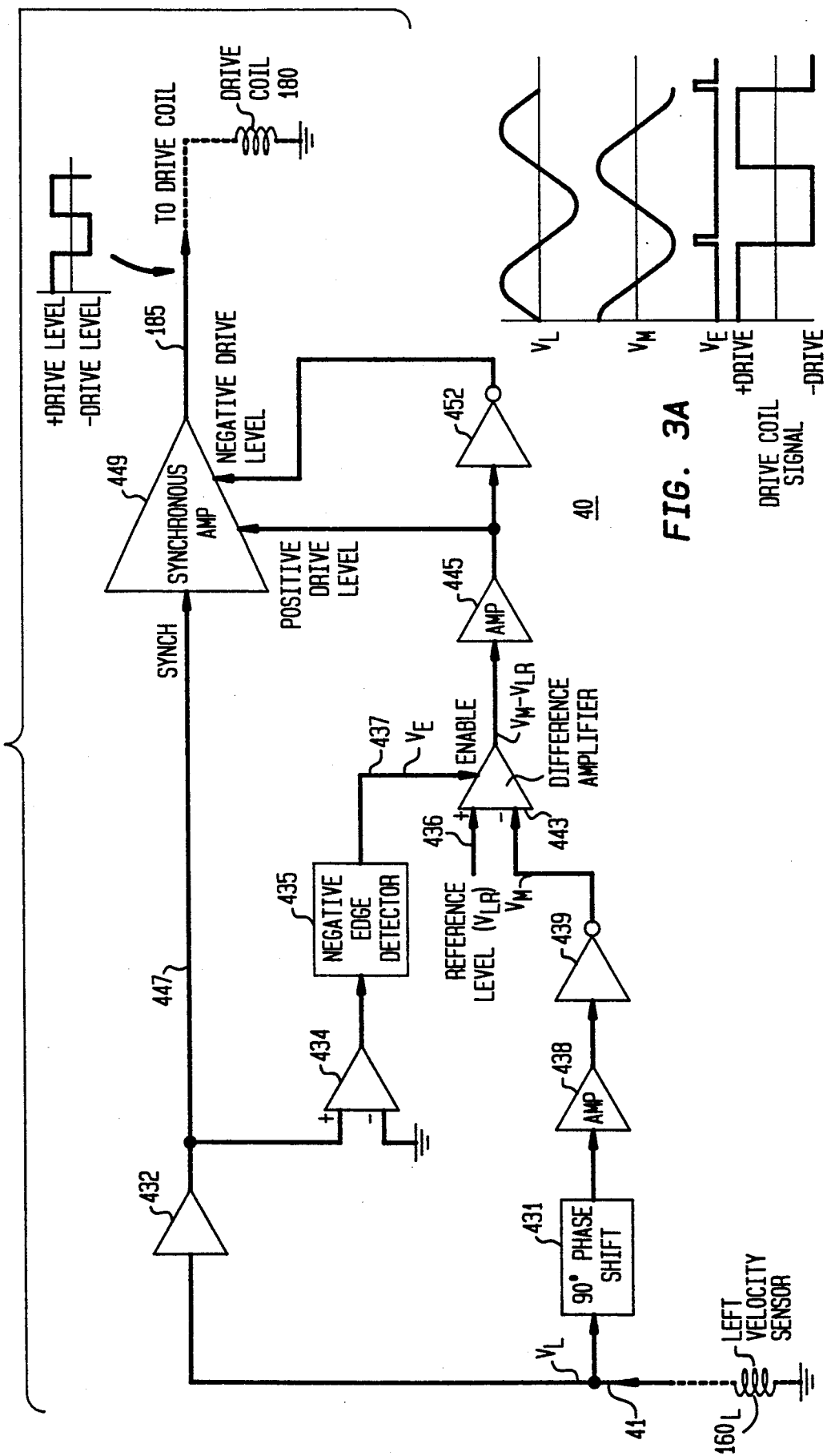
FIG. 3 is a block diagram of a prior art embodiment of flow tube drive circuit 40.

FIG. 3 depicts a block diagram of a well known embodiment of flow tube drive circuit 40, shown in FIG. 2. Throughout the following discussion of circuit 40, reference will be made, where appropriate, to various waveforms produced within or by circuit 40 and depicted within FIG. 3A. Accordingly, the reader should simultaneously refer to both FIGS. 3 and 3A throughout this discussion. Specifically, circuit 40 receives the left velocity signal produced by coil $160_L$ and, in response thereto, provides a square wave drive signal to drive coil 180 at a frequency equal to the resonant frequency of the flow conduit and in phase with and hence tightly synchronized to its movement. As such, this drive signal injects mechanical energy into both flow conduits to overcome inherent mechanical losses and thereby ensures that both conduits continuously vibrate at substantially, if not exactly, their common resonant frequency. Moreover, this circuit automatically adjusts the positive and negative magnitudes of the square wave drive signal in order to advantageously compensate for viscous damping properties of the fluid passing through the meter.

Specifically, synchronous amplifier 449 produces a square wave that switches from a positive drive level to a negative drive level synchronously with each zero crossing of the left velocity signal, $V_L$, i.e. when both flow conduits simultaneously reach an end point of their oscillatory travel. In particular, during the positive portion of velocity signal—as shown by its waveform, the synchronous amplifier routes a positive drive level to drive coil 180, via lead 185. Likewise, during the negative portion of the velocity signal, synchronous amplifier 449 routes a negative drive level to lead 185. The left velocity signal, $V_L$, appearing on lead 41 and produced by left velocity sensor $160_L$, is amplified by amplifier 432 before being applied as a switching signal to synchronous amplifier 449.

The remainder of this circuit sets the proper amplitude (magnitude and sign) for each of these two drive levels. In particular, the left velocity signal is shifted in phase by ninety degrees and then inverted to produce an oscillatory signal, $V_M$, that leads the left velocity signal by ninety degrees. The sign of the anticipatory signal $V_M$ determines what specific drive voltages will be applied as the positive and negative drive level inputs to synchronous amplifier 449 during the next half cycle of the velocity signal.

Specifically, the sinusoidal left velocity signal, $V_L$, produced by coil $160_L$ is applied, via lead 41, as input to ninety degree phase shifter 431. The sinusoidal output of the phase shifter is applied through amplifier 438 and linear inverter 439 to yield signal $V_M$ which, in turn, is applied to the inverting input of difference amplifier 443. Signal $V_M$ leads left velocity signal $V_L$ by ninety degrees and, as such, is the integrated left velocity (position) signal. Difference amplifier 443 compares signal $V_M$ against a pre-determined reference level, $V_{LR}$. A comparison occurs at every peak (positive and negative) of signal $V_M$ to determine if this peak value is a positive or negative peak. If the comparison indicates that the peak value lies below the reference level ($V_{LR}$), then this peak value is a negative peak. In this case, difference amplifier 443 will produce a positive level at its output which will result in a positive drive signal being produced by amplifier 445 and applied to the positive drive input to synchronous amplifier 449. Inasmuch, as the positive output of amplifier 445 is inverted by linear inverter 452, a negative drive signal is applied to the negative drive level input to the synchronous amplifier.

To prevent each of these drive signals from changing polarity during the next half cycle of signal $V_M$, difference amplifier 443 samples its inputs and provides a new output value only at the occurrence of a high level on its ENABLE input. In particular, this amplifier is enabled only at each negative going zero crossing in the left velocity signal, $V_L$, by a suitable enable pulse appearing on lead 437. To generate this pulse, the output of amplifier 432 is applied as input to comparator 434 which functions as a zero crossing detector. The output of this detector is a square wave which is in phase with left velocity signal $V_L$. This square wave is, in turn, applied as input to negative edge detector 435 which produces a pulse on lead 437 at each negative going transition in this square wave, i.e. at each negative going zero crossing in the velocity signal.

Drive circuit 40 functions as an automatic gain control by automatically varying the magnitudes of both the positive and negative drive levels in order to maintain the magnitude of the integrated left velocity (position) signal equal to the magnitude of the reference signal, $V_{LR}$. As such and as noted, this circuit advantageously compensates the drive signal and motion of the flow conduits for viscous damping properties of the fluid flowing through the meter. Specifically, since amplifier 445 is a linear amplifier with a pre-set gain, the output of this amplifier, and hence the magnitudes of both the positive and negative drive levels, will linearly vary with respect to the difference between the magnitudes of the position signal, $V_M$, and the reference signal, $V_{LR}$. For example, if the magnitude of position signal lies below (above) that of the reference signal, then the output of difference amplifier 443 increases positively (negatively). A drop in the magnitude of the position signal can result from an increase in the viscosity of the fluid passing through the meter which damps the motion of the flow conduits and correspondingly reduces the outputs of the velocity sensors and the magnitude of the position signal. Similarly, a decrease in fluid viscosity can correspondingly increase the magnitude of both of the velocity sensor output signals and the position signal. Now, for example, in the event the fluid viscosity increases and the amplitude of the position signal correspondingly decreases, the signal produced by difference amplifier 443 increases positively. This, in turn, increases the magnitudes of both drive levels which will subsequently increase the magnitude of the flow conduit vibration. The magnitudes of both drive signals and hence the vibration of the flow conduits will increase to whatever appropriate values are necessary to ensure that the magnitude of the position signal, $V_M$, once again equals that of the reference signal, $V_{LR}$. By automatically varying the magnitudes of both drive levels and flow conduit vibration in response to any changes in the magnitude of the position signal, drive circuit 40 advantageously compensates for any viscous damping imparted to the vibratory motion of the flow conduits by the fluid passing therethrough.

The gain of each amplifier and inverter in circuit 40 is selected to ensure that the magnitude of the drive signal applied to the drive coil is sufficient to vibrate both flow conduits in an equal sinusoidal pattern at their common resonant frequency. These gains can be adjusted to provide different amplitudes for the positive and negative drive signals in order to compensate for any physical differences that occur between the two flow conduits, e.g. bends, small kinks and the like that were incurred during mounting of both tubes into meter assembly 10 (see FIG. 1).

Unfortunately, this well known embodiment of drive circuit 40, being analog in nature, suffers various drawbacks. Specifically'.this circuit, which generates an alternating square shaped drive signal, does not permit the energy that is applied to the drive coil to be precisely controlled by the drive circuit itself during a cycle of this signal. This embodiment of the drive circuit is relatively complex and requires a multitude of parts which adds to the manufacturing cost of the meter electronics. In addition, this embodiment of the drive circuit suffers from undesirable temperature, aging and/or drift affects. While these affects can be minimized to a certain extent, doing so increases circuit complexity, parts count and hence manufacturing cost of the drive circuit and/or the costs associated with use of the meter.

Now, in accordance with the teachings of our invention, our inventive embodiment of drive circuit 40 substantially overcomes these deficiencies.

Specifically, our inventive drive circuit provides a pre-defined burst of energy to a drive coil affixed to a flow conduit at an appropriate point during a cycle of the oscillatory motion of the conduit in order to maintain the peak amplitude of the oscillatory motion substantially within a prescribed range. This burst can be applied at a pre-defined point in each cycle of the oscillatory motion with no energy being applied during that cycle other than when the burst occurs. Applying a burst of energy in this fashion rather than continuously, such as in the form of an alternating waveform as is done in the embodiment of drive circuit 40 discussed above, advantageously and significantly reduces the amount of electrical energy that is applied to the drive coil. To further reduce this energy, a burst need not be applied during every such cycle but rather only at the pre-defined points within those cycles where the peak amplitude of the oscillatory motion of the flow conduit is less than a pre-defined limit value. The number of successive cycles during which a burst is not applied will depend upon the actual rate at which the amplitude of the flow conduit oscillations decays. Our inventive drive circuit advantageously requires a relatively small number of parts compared with known drive circuit embodiments and principally relies on digital rather than analog circuitry thereby substantially eliminating the undesirable temperature, aging and/or drift affects associated with analog based drive circuits.

Figure 4:
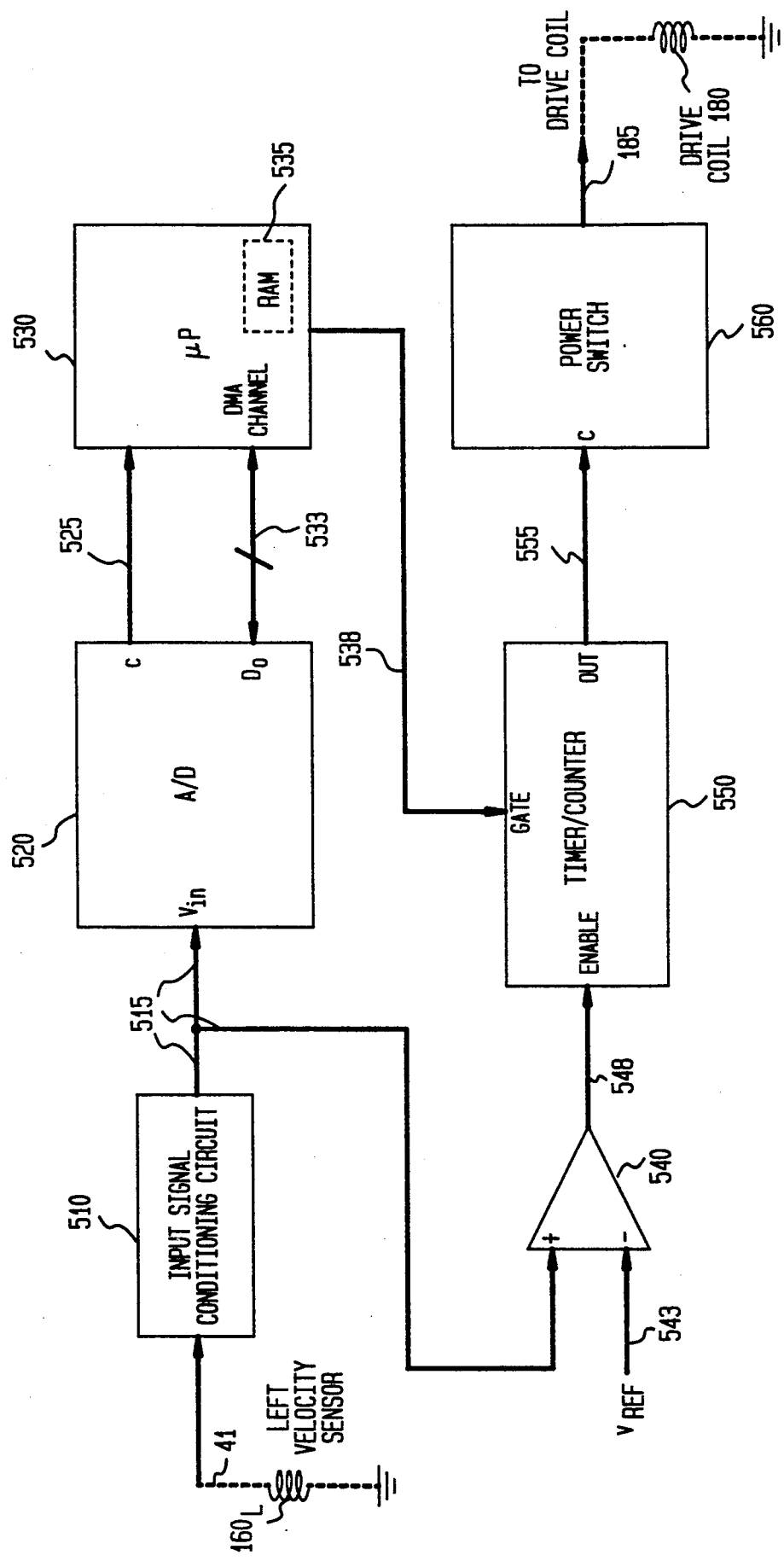
FIG. 4 is a block diagram of a preferred embodiment of drive circuit 40 constructed in accordance with the teachings of our present invention.

FIG. 4 is a block diagram of a preferred embodiment of drive circuit 40 constructed in accordance with the teachings of our present invention. Inasmuch as a clear understanding of the operation of the inventive circuit can be gained by considering both the block diagram and the left velocity waveform as processed therein, during the following discussion the reader should also simultaneously refer to FIG. 6 which shows two illustrative cycles of the left velocity signal and the temporal relationship between the this velocity signal and the occurrence of drive signal bursts produced by our inventive drive circuit.

As shown in FIG. 4, our drive circuit utilizes microprocessor 530, which here is illustratively a model 80186 microprocessor manufactured by the Intel Corporation of Santa Clara, California. Any one of a variety of other commercially available microprocessors can be used to implement microprocessor 530. Not only does microprocessor 530 perform calculations needed to implement the functionality of our inventive drive circuit, but the microprocessor also provides other necessary processing functions, hereinafter referred to as "non-drive" related meter functions, needed within mass flow rate circuit 30 (see FIG. 2), such as illustratively calculating the mass flow rate and totalized flow values. Inasmuch as these "non-drive" related meter functions and their related circuitry are well known in the art as are the connections of this circuitry within mass flow rate 30 to the microprocessor that are needed to implement these functions, then, in an effort to simplify the drawings and the following discussion, all of these "non-drive" related meter functions, the associated circuitry and the interconnections required therefor have been omitted from both the drawings and the following discussion. In any event, by virtue of sharing the use of a common microprocessor to provide both "drive" and "non-drive" related processing, the manufacturing cost and parts count of our inventive drive circuit is advantageously less than that associated with drive circuits known in the art.

Specifically, as shown in FIG. 4, the output from one of the velocity sensors, e.g. here left velocity sensor 160$_L$, is routed via lead 41 to input signal conditioning circuit 510, and therefrom through lead 515 to an analog input to analog-to-digital (A/D) converter 520. Circuit 510 consists of well known filtering and amplification functions needed to remove noise from the left velocity signal and scale the signal to a full scale range compatible with A/D converter 520. A/D converter 520 periodically samples the scaled and filtered left velocity sensor signal appearing on lead 515 and generates a multi-bit parallel equivalent digital output word on leads 525. These leads are connected to a direct memory access (DMA) channel input to microprocessor 530. The microprocessor is configured in a well known manner such that whenever A/D converter 520 has completed a conversion, it applies a suitable "Conversion Complete" signal to lead 525 and applies the resulting digital word over leads 533. Through a well known "cycle stealing" technique, the digital word is directly transferred from the output of A/D converter 520 on a direct memory access (DMA) basis into an input/output space (not specifically shown) located within internal random access memory (RAM) 535 existing within the microprocessor. Once a pre-defined number of successive locations situated within this I/O space have been filled, thereby holding a sufficient number of successive samples to fully characterize one cycle of oscillatory tube movement, then the microprocessor transfers all these samples, again on a DMA basis, from the I/O space to a memory array (also not specifically shown) also located within RAM 535 for subsequent processing, as described in detail below. Based upon the processing of these samples, the microprocessor determines whether the amplitude of the vibratory motion of the flow conduits has decayed to a sufficient value to warrant applying a burst of energy to the flow conduits. In the event a burst of energy is to be applied, then microprocessor 530 applies a suitable level, via lead 538, to a "gate" input of timer/counter 550 in order to activate a pulse width modulated (PWM) output situated within the timer/counter. This PWM output, when activated by the microprocessor and enabled, as discussed below by comparator 540, produces a pulse having a pre-defined width on output lead 555. The width of this pulse is appropriately programmed into timer/counter 550 in a well known fashion by microprocessor 530 during system initialization. The pulse appearing on lead 555 is routed through power switch 560, typically a field effect transistor (FET) power switch, which amplifies this pulse to a pre-defined level and thereafter applies a resulting drive pulse through lead 185 to drive coil 180. Power switch 560 would also include an appropriate typically mechanical switch contact (well known and not shown) in its output lead that, in response to the operation of suitable well known "watch-dog" circuitry (also not shown), would open and short the drive coil to ground in the event a malfunction occurred thereby removing any drive power from the drive coil and thereby causing the meter to fail in a "fail-safe" manner which protects the flow conduits.

Inasmuch as mass flow rate measurements rely on accurately locating the zero crossings of each velocity waveform—but not using the remainder of either velocity waveform, we have determined that to avoid introducing errors into phase measurements between corresponding zero crossings of the two flow conduits, it is preferable not to apply a drive pulse to the flow conduits during any zero crossing in the left velocity signal. As such, comparator 540 is used to establish a window during which drive pulses can be applied during each velocity waveform. Specifically, one input to comparator 540 is the amplified and scaled left velocity sensor signal appearing on lead 515. A relatively low amplitude direct current (DC) reference voltage, $v_{REF}$, is applied, via lead 543, to the other input of the comparator. The value of the reference voltage, though not critical, is typically set to approximately 20% of the expected peak amplitude of the amplified and scaled left velocity sensor signal appearing on lead 515. Accordingly, comparator 540 will produce a high level on lead 548 during the middle 80% of the positive half of each cycle in the left velocity sensor waveform, illustratively shown in FIG. 6 as having a duration "t", and a low level elsewhere. The signal appearing on lead 548 is applied to an "enable" input to timer/counter 550. As a result, timer/counter 550 will produce a PWM pulse on output lead 555 only if the enable signal is high and coincidentally therewith a proper level change appears on lead 538 from microprocessor 530. In this fashion, a burst of energy, if needed, will only be applied during a positive "drive window" during a corresponding positive half cycle of flow conduit movement.

We have determined that to add mechanical energy to the flow conduits in order to increase the amplitude of the vibratory motion of the flow conduits, it is not critical where a burst of energy, here a positive PWM pulse having a specific width, is applied to the flow conduits as long as that burst is applied within the positive "drive window". In this manner, the mechanical force produced by the burst will add to and hence supplement the instantaneously occurring vibratory motion of the flow conduits. Alternatively, if energy is to be removed from the vibrating flow conduits so as to retard (brake) their vibratory motion and hence reduce the peak amplitude of their oscillations, then a burst of energy could be applied in a suitable "negative" drive window occurring during the negative portion of a cycle such that then the mechanical force created by the burst will oppose the instantaneously occurring vibratory motion of the conduits. Furthermore, although positive going pulses of energy can be used to supplement or retard the vibratory motion of the flow conduits, negative going pulses can also be used, either alone or in conjunction with positive going pulses, during appropriate "positive" or "negative" drive windows to provide fine control over the vibratory motion of the flow conduits. The positive and negative pulses can be differently sized and/or the width of each such pulse can be dynamically set just prior to its occurrence, as required by the microprocessor through suitable programming of timer/counter 550, based upon the magnitude of the change that needs to be made in the amplitude of the vibratory motion of the flow conduits. While drive circuits using positive and negative and/or even bi-directional drive pulses can be implemented, implementation of such circuits is significantly more complex than the simple implementation of the unidirectional drive circuit described above as the preferred embodiment of our invention.

Figure 5:
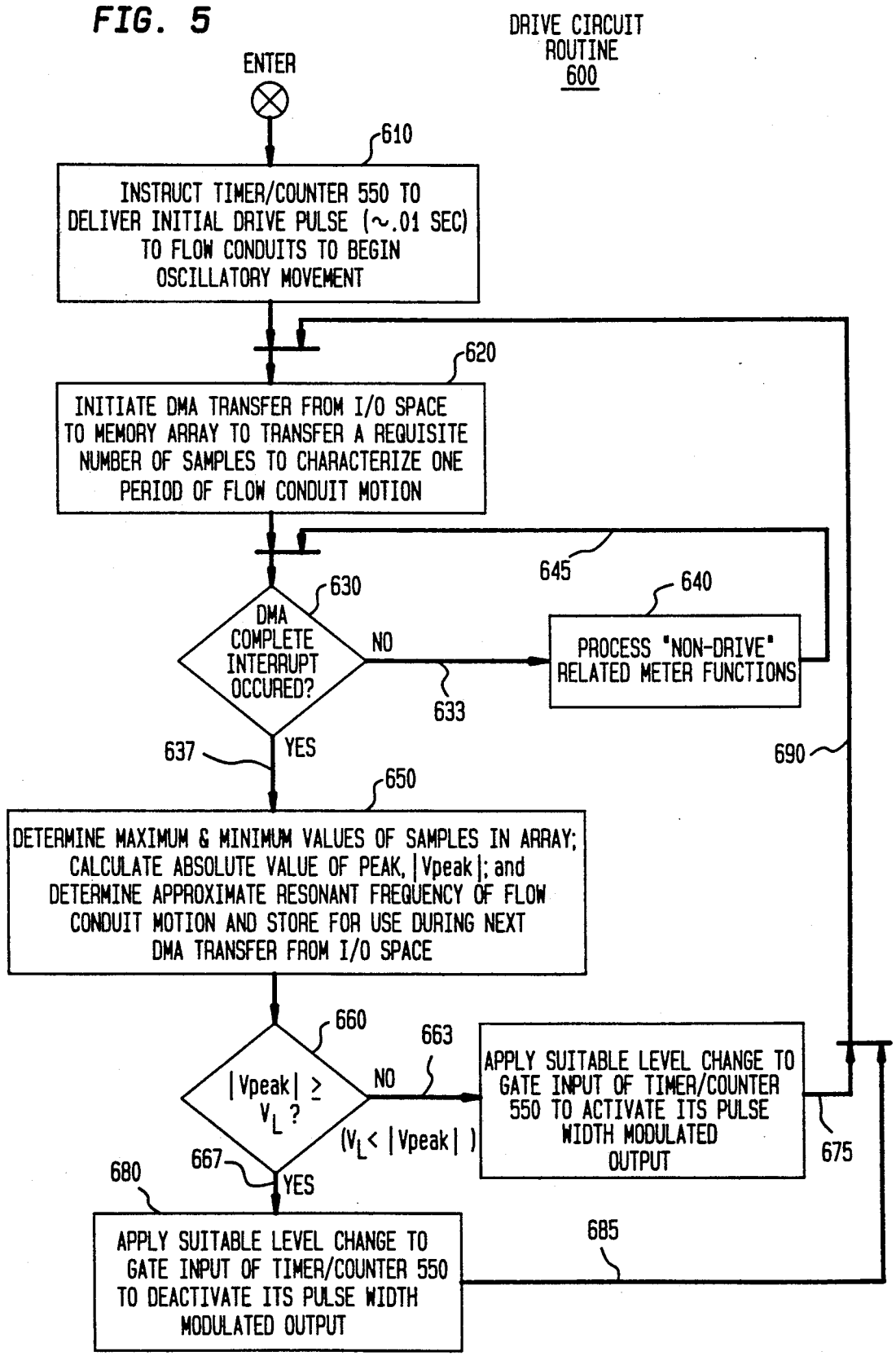
FIG. 5 depicts a flowchart of drive circuit routine 600 executed by microprocessor 530 shown in FIG. 4 to generate a drive signal in accordance with the teachings of our invention.
Figure 7:
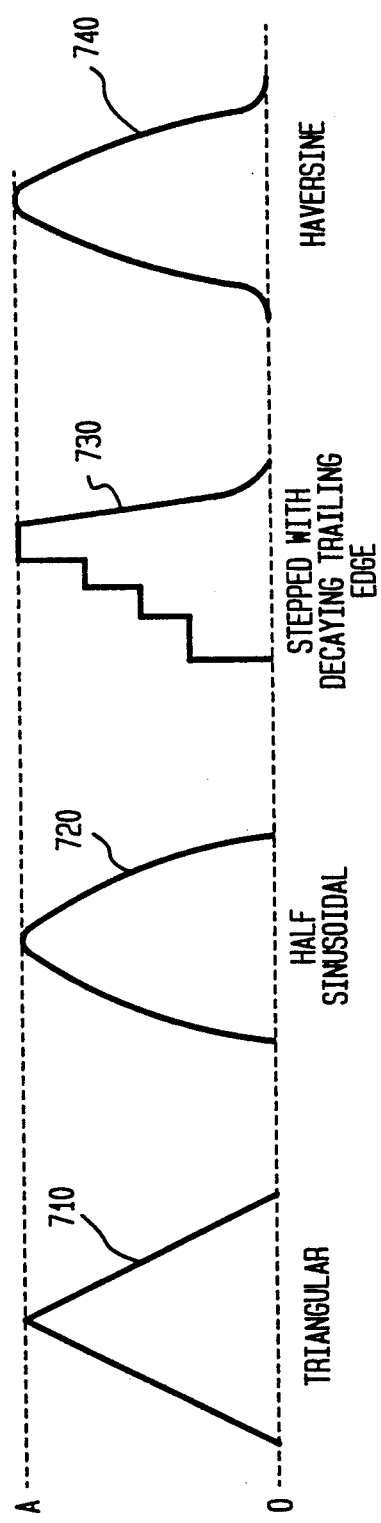
FIG. 7 depicts various illustrative waveforms each of which can be used to produce a drive signal burst.

We have also determined that the pulse can take on any one of a multitude of different waveforms such as illustratively triangular, rectangular—as is used in the embodiment shown in FIGS. 4 and 5, half sinusoid, stepped or haversine, or be modulated in any one of a wide variety of manners, e.g. pulse width modulated, amplitude modulated or the like to control its energy content. Examples of triangular, half sinusoid, stepped and haversine bursts are respectively shown in FIG. 7 by waveforms 710, 720, 730 and 740. To reduce the likelihood that inductive kickback will occur from drive coil 180 whenever the pulse is over and hence provide quieter operation than that which might otherwise occur, the pulse might preferably contain a decaying trailing edge, as illustratively shown by each of the waveforms in FIG. 7. The specific manner by which the trailing edge decays, i.e. linear or exponential, is not thought to be critical as long as the decay is smooth. If a non-rectangularly shaped pulse is desired, then timer/counter 550 could be replaced with suitable programmable waveform generation circuits. Alternatively, a waveform for a cycle of a given non-rectangularly shaped pulse could be stored within a suitable read only memory (ROM) (not shown) and sequentially accessed, when needed, by the microprocessor or other circuits operating under the control of the microprocessor and thereafter applied through a power amplifier to drive coil 180. The output of comparator 540 (or the like for a "negative" drive window) would be applied to a suitable "enable" input to the power amplifier to prevent the application of a burst outside of a desired drive window.

A flowchart of drive circuit routine 600 executed by microprocessor 530 shown in FIG. 4 to generate a drive signal in accordance with the teachings of our invention is shown in FIG. 5. Again to form a clear understanding of the operation of our inventive drive circuit, the reader should also simultaneously refer to FIG. 6 throughout the following discussion.

Upon entry into routine 600 shown in FIGS. 5A, execution first proceeds to block 610. This block, when executed, performs various initialization procedures. As it pertains to driving the flow conduits, one of these procedures provides a sufficiently long drive pulse to initially place the conduits into resonant vibration. This specifically occurs by the microprocessor providing a suitable instruction to timer/counter 550 to cause the latter to generate a rectangular pulse having a duration of approximately 0.01 seconds, though in excess of a minimal duration the length of the drive pulse is not critical. In the event, oscillatory velocity signals do not occur, block 610 generates another pulse. This continues until a sinusoidally varying velocity signal is detected or a finite number of attempts have occurred. If no velocity waveform occurs after all these attempts have occurred, then a fault condition is presumed to occur and execution remains within block 610 pending suitable user intervention to clear the fault and reset the system. Alternatively, if proper vibratory motion is initiated, then execution proceeds to block 620.

Block 620 initiates a DMA transfer of a specific number of successive samples that characterize one complete cycle of the left velocity sensor signal from the I/O space within internal microprocessor RAM to the memory array also located within the RAM. This number is based upon the approximate frequency of this signal which is determined during the preceding cycle in the manner set forth below. Until this DMA transfer has completed, the microprocessor is free to successively perform other "non-drive" meter functions, such as illustratively mass flow calculations, as diagrammatically represented by decision block 630 and execution block 640 and with execution being directed through the NO path emanating from decision block 630. Now, when the DMA transfer is complete, as signalled by an internal DMA Complete interrupt occurring within the microprocessor, execution proceeds along YES path 637 from decision block 630 to execution block 650.

Block 650, when executed, determines the maximum and minimum values, $V_{max}$ and $V_{min}$, respectively, of the samples of the single cycle of the left velocity sensor waveform now stored within the memory array. After these values have been determined, the microprocessor determines the absolute value of the peak value of this waveform. This absolute peak value is illustratively given by the following equation, which advantageously eliminates the effects of any DC offsets in the sampled signal:

$$|V_{peak}| = (|V_{max}|/2) + (|V_{min}|/2) \qquad (1)$$

Once this occurs, block 650 determines the approximate resonant frequency of the left velocity sensor signal based upon the number of samples that occur between two successive zero crossings in this sampled signal, through use of the following formula:

$$F_w = N \cdot \sigma \qquad (2)$$

where:
$F_w$ is the approximate frequency of the sampled left velocity sensor waveform;
N is the number of samples occurring between the two successive zero crossings in this waveform; and
$\sigma$ is the periodic sampling frequency of A/D converter 520 (see FIG. 4).

Based upon the frequency value, the microprocessor determines the appropriate number of samples that presently constitutes a complete cycle of the left velocity sensor waveform and appropriately stores this value for programming the DMA operation, during subsequent execution of block 620, in order to transfer just this number of samples from the I/O space to the memory space for use during processing the next cycle of the left velocity sensor waveform. Although this frequency value may not exactly match the actual resonant frequency of this waveform and of the flow conduits, any resulting differences are likely to be very small and not critical.

Figure 6:
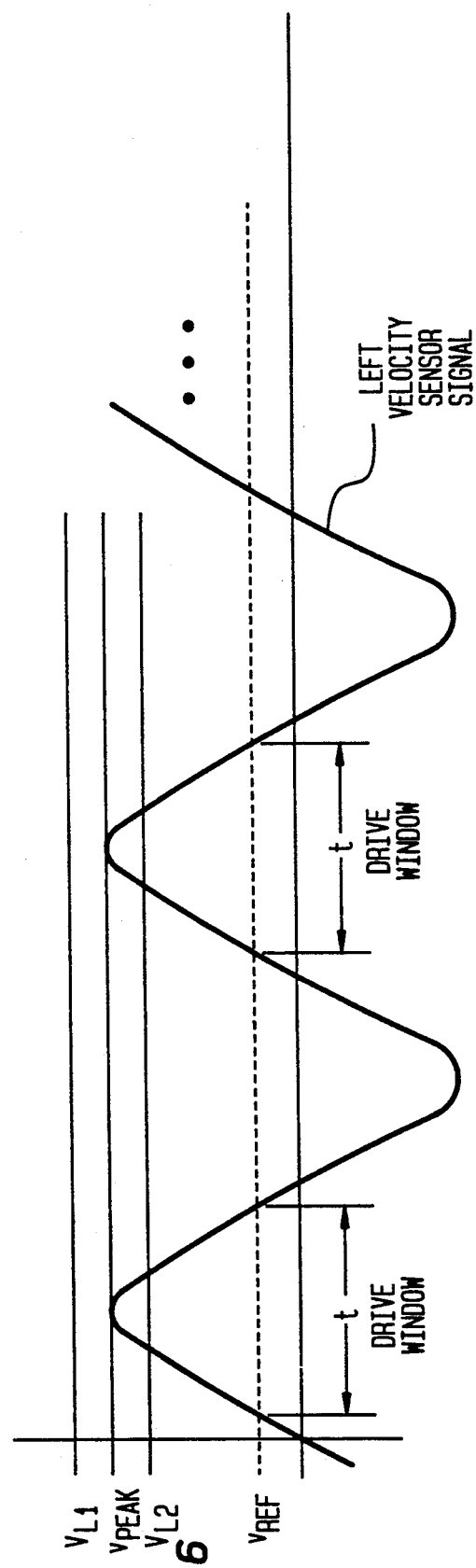
FIG. 6 is a waveform depicting two illustrative cycles of the left velocity signal and the temporal relationship between this velocity signal and the occurrence of drive signal bursts produced by our inventive drive circuit.

Once block 650 has completely executed, execution proceeds to block 660 which tests the absolute value of the peak, $V_{peak}$, against a pre-defined limit value, $V_L$. This limit value is set to reflect a lower limit on the amplitude of the vibratory motion of the flow conduits, i.e. the point below which a burst of energy needs to be imparted to the flow conduits to restore the amplitude of their vibratory motion. In the event decision block 660 determines that the limit value is greater than the absolute value, which would occur in the event, for example, value $V_{L1}$ shown in FIG. 6 is the limit value, then decision block 660 (see FIG. 5) routes execution, via NO path 663, to execution block 670. This latter block, when executed, causes the microprocessor to apply a suitable level to a "gate" input of timer/counter 550 in order to activate the PWM output thereof. As noted above, this activation by itself and in the absence of a positive level being applied by comparator 540 (see FIG. 4) to the "enable" input to the timer/counter during a suitable drive window, shown in FIG. 6 as having a duration "t", would not result in a pulse being applied to the coil. Alternatively, in the event that decision block 660 (see FIG. 5) determines that the limit value is less than or equal to the absolute value, which would occur in the event for example value $V_{L2}$ shown in FIG. 6 is the limit value, then decision block 660 routes execution, via NO path 663 (as shown in FIG. 5) to execution block 680. In this case, the amplitude of the oscillatory movement of the flow conduits is sufficiently large; therefore no energy needs to be added to the flow conduits at this time. This latter block, when executed, causes the microprocessor to apply a suitable level to a "gate" input of timer/counter 550 in order to deactivate the PWM output thereof. After either block 670 or 680 executes, execution returns, via respective paths 675 or 685, and 690, back to block 620. Alternatively, the determination as to whether a burst of energy needs to be applied to the flow conduits can be made based upon whether a difference between the absolute value of the peak, $V_{peak}$, and the pre-defined limit value, $V_L$, exceeds a threshold value; if the threshold value is not exceeded, then no such burst needs to be applied.

Although a burst has been described in terms of containing only one pulse, a burst can in fact be implemented as containing a succession of pulses, of a desired shape, wherein the pulse count is changed to vary the energy content being imparted to the vibrating flow conduits. In addition, although the determination of the need to apply a burst of energy and its application have been described as occurring within a common cycle, this determination can occur during one such cycle with the burst being applied during a suitable drive window occurring during the next cycle of flow conduit motion. Burst determination and application and even mass flow rate measurements could all occur on different cycles of oscillatory flow conduit motion, if necessary.

Moreover, the limit value, $V_L$, could dynamically change based upon and therefore adapt to the actual operations conditions encountered by the Coriolis meter, such as, for example, sudden changes in fluid density. By doing so, the drive circuit can impart minimal amounts of energy to the drive coil that are nevertheless sufficient to sustain the flow tubes in resonant oscillatory motion with a pre-defined peak value. Specifically, the limit value can be changed, e.g. increased, by the microprocessor, either gradually or in a single step, whenever the rate of change in the absolute value of the peak is sufficiently high so that bursts of mechanical energy can be rapidly added to the vibrating flow conduits, such as over a larger number of successive cycles than would otherwise occur. Adding bursts of energy in this fashion quickly compensates for increased attenuation that occurs in the peak of the vibratory amplitude of the flow tubes, caused by large rapid increases in the fluid density. Moreover, whenever the absolute value of the peak amplitude reaches or exceeds the increased limit value, the limit value can be appropriately decreased, again either gradually or by a single step, by the microprocessor to a pre-defined default value in order to reduce the rate at which mechanical energy will be imparted to the vibrating flow conduits.

In addition, although the limit value, $V_L$, has been described as being a single level, it could in fact be a range defined by high and low bounds. Our drive circuit could be easily configured such that, if the high bound were to be traversed, then energy bursts would be applied in a manner that retards the oscillations of the flow conduits and therefore lowers the amplitude of these oscillations; while if the lower bound is traversed, energy bursts would be applied in a manner that supplements and thereby increases the amplitude of the oscillations of the flow conduits. Moreover, the values of these bounds could dynamically change based upon and therefore adapt to, as described above, the actual operating conditions encountered by the Coriolis meter.

Also, those skilled in the art recognize that, although the disclosed embodiment utilizes U-shaped flow conduits, flow conduits (tubes) of almost any size and shape may be used as long as the conduits can be oscillated about an axis to establish a non-inertial frame of reference. For example, these conduits may include but are not limited to straight tubes, S-shaped conduits or looped conduits. Moreover, although the meter has been shown as containing two parallel flow tubes, embodiments having a single flow tube or more than two parallel flow tubes—such as three, four or even more—may be used if desired.

Although a single embodiment of the invention has been shown and described herein, many other varied embodiments that incorporate the teachings of the present invention can be readily fabricated by those skilled in the art.

We claim:

1. A Coriolis meter having a drive circuit for supplying energy to a drive coil used within the meter and wherein the meter has at least one flow conduit, said meter comprising:
    a drive mechanism, having a drive coil, affixed to a flow conduit for causing said conduit to move about a pre-defined bending axis; and
    energy providing means, connected to said drive coil and responsive to a signal representing motion of the flow conduit, comprising:
    means for measuring said signal so as to produce measured values thereof;
    means, responsive to said measured values, for determining whether the signal has an amplitude value that is less than a limit value at a pre-defined point on said signal; and
    applying means, responsive to said determining means, for providing a pre-defined burst of energy to said drive coil at a pre-defined point in a cycle of oscillatory movement of said flow conduit in the event said amplitude value is less than said limit value and for providing substantially no energy to said coil during said cycle other than when said burst occurs, wherein said applying means provides substantially no energy to said drive coil anytime during said cycle in the event said amplitude value equals or exceeds said limit value such that said flow conduit oscillates with a peak amplitude that remains substantially within a prescribed range.

2. The meter in claim 1 wherein said burst has a decaying trailing edge.

3. The meter in claim 2 wherein said energy providing means further comprises:
    means for comparing the amplitude value against a pre-determined voltage level to form a difference value;
    means, responsive to said difference value, for providing the burst of energy to said drive coil in the event said difference exceeds a threshold value and for providing no energy to said drive coil in the event said difference does not exceed the threshold value.

4. The meter in claim 3 wherein said burst is a voltage pulse having a shape that resembles one half of a sinusoid or a haversine, or is substantially rectangular, triangular or stepped in shape.

5. The meter in claim 4 further comprising:
    a memory for storing the shape of said voltage pulse as a succession of points in a waveform; and
    means, responsive to said energy burst providing means and connected to said memory, for sequentially accessing each successive point in said waveform from the memory in order to generate the burst.

6. The meter in claim 1 wherein said burst is a voltage pulse having a shape that resembles one half of a sinusoid or a haversine, or is substantially rectangular, triangular or stepped in shape.

7. The meter in claim 6 wherein said burst has a decaying trailing edge.

8. The meter in claim 1 wherein said energy providing means comprises means for varying said limit value in response to a rate of change of said signal at said pre-defined point.

9. The meter in claim 8 wherein said limit value varying means comprises means for increasing said limit value in response to the rate of change of said signal being equal to or exceeding a sufficiently negative value at said pre-defined point so as to impart additional energy to said flow conduit as density of a process fluid flowing through said flow conduit increases whereby over successive cycles in said oscillatory motion said peak amplitude of said flow conduit increases to a value lying within said prescribed range.

10. The meter in claim 9 wherein said burst has a decaying trailing edge.

11. The meter in claim 9 wherein said burst is a voltage pulse having a shape that resembles one half of a sinusoid or a haversine, or is substantially rectangular, triangular or stepped in shape.

12. The meter in claim 11 wherein said burst has a decaying trailing edge.

13. The meter in claim 12 wherein said energy providing means further comprises:
    means for comparing the amplitude value against a pre-determined voltage level to form a difference value;
    means, responsive to said difference value, for providing the burst of energy to said drive coil in the event said difference exceeds a threshold value and for providing no energy to said drive coil in the event said difference does not exceed the threshold value.

14. A Coriolis meter having a drive circuit for supplying energy to a drive coil used within the meter and wherein the meter has at least one flow conduit, said meter comprising:
    a drive mechanism, having a drive coil, affixed to a flow conduit for causing said conduit to move about a pre-defined bending axis;

means, responsive to a signal representing motion of the flow conduit, for detecting the occurrence of a pre-defined point on said signal and for providing an amplitude value of said signal at said point;

means for comparing the amplitude value against a pre-determined voltage level to form a difference value; and means, responsive to said difference value, for providing a pre-defined burst of energy to said drive coil at a pre-defined point in a cycle of oscillatory movement of said flow conduit when said difference exceeds a threshold value and for providing no energy to said drive coil at said point in the event said difference does not exceed the threshold value, whereby peak amplitude of the oscillatory movement of said flow conduit remains substantially within a prescribed range.

15. The meter in claim 14 wherein said burst is a voltage pulse that resembles one half of a sinusoid or a haversine, or is substantially rectangular, triangular or stepped in shape, and wherein said burst has a decaying trailing edge.

* * * * *